P. J. HAMLER, DEC'D.
G. W. CHILDS, ADMINISTRATOR.
AGITATOR DRIER.
APPLICATION FILED MAR. 25, 1920.

1,434,613.

Patented Nov. 7, 1922.
4 SHEETS—SHEET 3.

Witness:
L. Kornfeld.

Inventor:
Peter J. Hamler
by Wm. Carey Eichelman
Attorney.

P. J. HAMLER, DEC'D.
G. W. CHILDS, ADMINISTRATOR.
AGITATOR DRIER.
APPLICATION FILED MAR. 25, 1920.

1,434,613.

Patented Nov. 7, 1922.
4 SHEETS—SHEET 4.

Witness:

Inventor:
Peter J. Hamler
by his Attorney.

Patented Nov. 7, 1922.                                           1,434,613

UNITED STATES PATENT OFFICE.

PETER J. HAMLER, DECEASED, LATE OF CHICAGO, ILLINOIS, BY GEORGE W. CHILDS, ADMINISTRATOR, OF CHICAGO, ILLINOIS, ASSIGNOR TO HAMLER BOILER AND TANK COMPANY, OF CHICAGO, ILLINOIS.

AGITATOR DRIER.

Application filed March 25, 1920. Serial No. 368,735.

*To all whom it may concern:*

Be it known that PETER J. HAMLER, deceased, late a citizen of the United States of America, and a resident of Chicago, county of Cook, State of Illinois, invented certain new and useful Improvements in Agitator Driers, of which the following is a specification.

My present invention relates to improvements in the design and construction of machines, or driers, as employed in the manufacture of commercial fertilizer from tankage and other products or by-products which are to be dried, wherein, one, two, or more materials, which contain a large portion of free moisture are first well mixed, and then dried, or dehydrated.

The specific design of the drier shell proper has been clearly shown and desribed in my former application for patent, filed May 28th, 1919, which issued Nov. 11th, 1919, bearing Patent #1,321,628, which patent specifications describes the many improvements and advantages incident thereto, to wit:—

The elimination of staybolts, having provided an inner shell so constructed as to withstand the collapsing force due to the steam pressure between the inner and outer shell, the providing of a smooth inner surface for the inner shell, thus permitting the agitator arms to travel close thereto and prevent the accumulation or deposit of material upon said surface, thereby increasing the efficiency of the heating surface of the inner shell by the elimination of a possible insulator; the providing of an increased heating surface for the inner shell; the providing for the expansion and contraction of the metal of the shell; and, finally by the omission of staybolts, the use of lighter gauge metal in the construction of the inner shell to affect the same usage as heretofore.

In addition to the above improvements in the art, it is now my desire to present future and more detailed specifications on additional improvements not heretofore disclosed.

In the mounting of the agitator shaft, it is common practice today to set the ends of the shaft in ordinary babbitted pillow blocks or boxes resting upon ledges or shelves projecting outwardly from the heads of the drier, which boxes are adjustable vertically to permit of the alining of the shaft. This arrangement soon permits of the boxes coming loose due to the excessive vibration of the apparatus, allowing the shaft to drop down and subsequently the paddles or agitator arms to scrape the bottom section of the inner shell until leaks are developed, thus rendering the shell useless.

Often times it is desirable to maintain an appreciable vacuum in the interior of the shell, in which case this old type of bearing is not applicable as no means of packing the journal is provided for.

It is now one of the objects of this invention to provide a journal to overcome the above difficulties;—a journal which will run in a bath of oil, which reduces friction losses to a minimum and which will further be sealed against the loss of the lubricant; and further, to pack the bearing to enable me to maintain a vacuum on the interior of the inner shell from 26 to $27\frac{1}{2}$ inches, which, when sealed, will not drop more than one inch per hour.

In addition to the above, my new bearing permits of the adjustment of the shaft either vertically or horizontally so that the agitator arms may be centered to rotate true to the periphery of the inner shell.

A further object of my invention is to provide a clamp for securing the agitator arms to the agitator shaft, which design provides ready assembly at the same time being durable and designed to meet the heavy strain occasioned by rough usage, A still further object of my invention is to develop an apparatus or machine, the several parts of which are adapted to coordinate both in design and operation, developing a drier which will handle more material in a specified length of time than any other of equivalent heating surface, using less steam to dry with and less power for agitation; and finally, turning out a better, cleaner and more uniform product for commercial use; to use less lubricant for better lubrication of the moving parts thus to prolong their lives; better and stronger agitator arms and clamps to overcome one of the most prevalent faults of those on the market today and thus to overcome breakage and deterioration of these parts.

These improvements in the art I have found will add years to the life of my new drier over those in common use today.

Having the above objects in view as well as others which will be apparent to those skilled in the art to which my invention appertains, my invention consists in certain features of construction hereinafter referred to in the specifications, more particularly as pointed out in the claims, and as shown in the accompanying drawings, in which:—

Similar reference characters refer respectively to similar parts throughout the several views.

Figure 1:
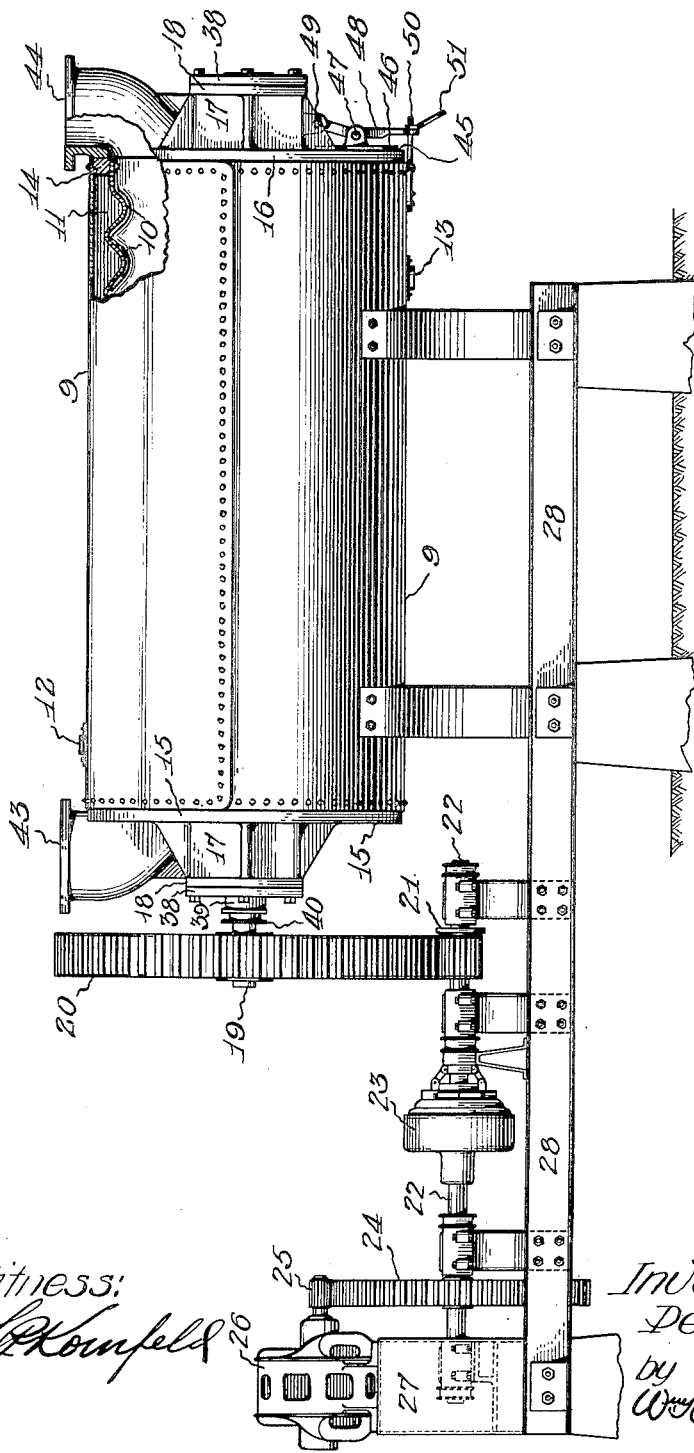
Figure 1 illustrates my invention in side elevation, a fragment of the shell being broken away.

Referring to the drawings, my drier comprises an outer shell 9, within which is enclosed an inner corrugated shell 10, combining therewith to form an intermediate annular steam chamber 11. The outer shell is provided with flanges 12 and 13 through which the steam is led to the chamber 11 and discharged when condensed. The respective open ends of the steam chamber are closed in any approved manner, preferably by spacing ring 14, as shown, to which are secured the heads 15 and 16, of the drier. These heads are of a heavy cast iron construction as shown, each carrying a centrally located journal box comprising a substantially reinforced housing 17 open on its outward face and terminating in a flange 18.

These journal boxes support an axially arranged agitator shaft 19, square in cross-section, but turned down at its ends to fit the bearing hereinafter described, which shaft extends beyond the forward bearing and carries a spur gear 20, with which meshes a pinion 21 on the drive shaft 22, which receives its power preferably through a chain of gears and clutch 25, 24 and 23 respectively from a motor 26 carried on a stand 27, all of which parts are carried on the structural steel framework 28, including drier itself, as clearly shown (Fig. 1 of the drawings).

Figure 2:
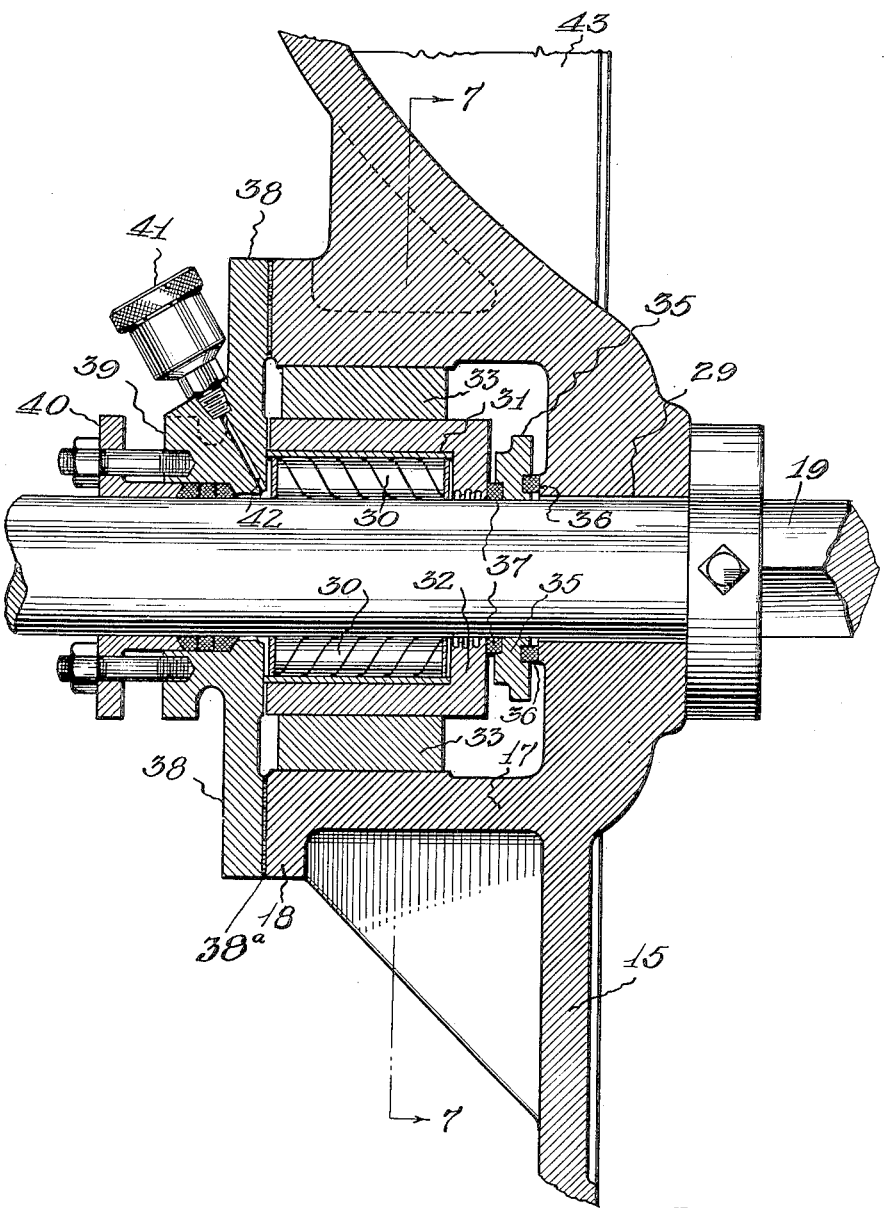
Figure 2 is an enlarged fragmental sectional view through the forward main bearing.

Referring more particularly to Figure 2 of the drawings it will be noted that the agitator shaft 19 enters the journals through an opening 29 in the rear wall thereof, whereas the bearing proper comprises a set of annularly disposed roller bearings 30, the inner race being removed so as to ride directly upon the shaft 19, which bearings 30 run in a solid outer race 31 carried in a heavy cast iron block 32 which hereafter I will refer to as the carriage. This carriage 32 is mounted within the journal box 17 being spaced from the top and bottom walls thereof by means of wedge blocks 33—33, which are adjustable laterally against the inner surface of the top wall of the journal box 17 and the top of the carriage 32 and locked in place by set screws 34 passing through the vertical walls of the journal boxes. Interposed between the front wall of the journal box 17 and the rear wall of the carriage 32 and around the shaft 19 is a collar 35 carrying a ring of packing 36 against the face of the journal 17, and a ring of packing 37 against the shaft 19 and carriage 32.

The open face of the housing is closed by a plate 38 carrying a stuffing box 39 and gland 40, which plate is secured to and packed with a gasket 38ᴬ against the flange 18. The plate 38 further carries a grease cup 41 whereby lubricant is fed to the bearing through an oil hole 42 in the plate itself.

From the foregoing, it will be seen that I have provided a bearing for the agitator shaft, embodying the latest design of roller bearing with an adjustable carriage, both of which are held in a bath of oil and are packed to prevent the unwarranted escape of the lubricant; also against the entrance of foreign matter to the bearing proper. This packing of the bearing has a still further asset;—namely the packing of a bearing which will allow me to pull and hold a substantial vacuum on the interior of the drier.

The forward head 15 terminates at its upper side into a hopper 43, preferably employed as a means for charging the drier, while the rear head 16 has a corresponding opening 44 employed for exhausting the vapors from the interior thereof.

The rear head 16 further is provided with a discharge opening 45 closed by means of a door 46, pivoted at 47, to an intermediate point on a clamping lever 48 fulcrumed at 49 to the head 16. The free end of this lever 48 receives the outer end of a pivoted lock bolt 50, upon which is threaded a clamping nut 51 for the purpose of clamping the lever 48 and thus the door 46 in a position to cover the discharge opening 45 and seal it vacuum tight.

Figure 3:
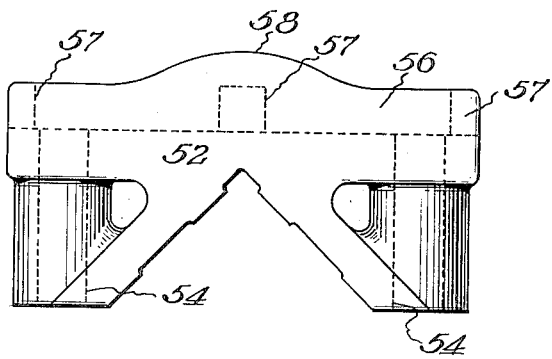
Figure 3 is a front elevation of one half of the agitator arm clamp.
Figure 4:
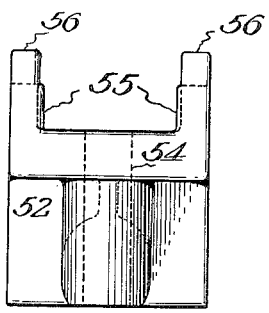
Figure 4 is an end elevation of Figure 3.
Figure 5:
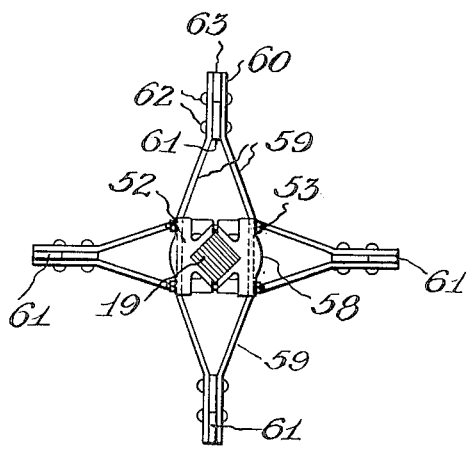
Figure 5 is an end elevation of the agitator arms shown assembled to the shaft.
Figure 6:
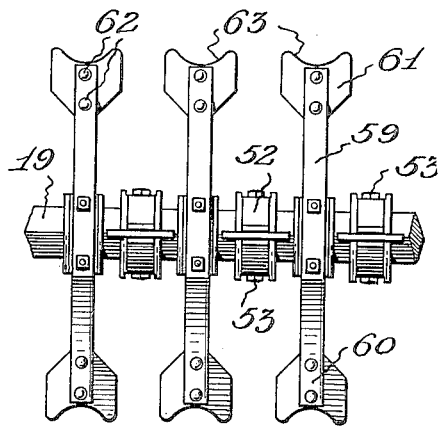
Figure 6 is a fragmental view taken at right angles Figure 5.
Figure 8:
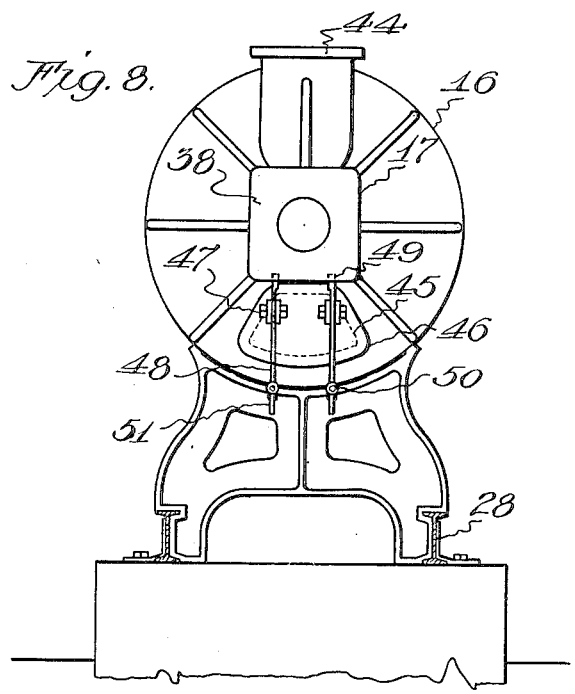
Figure 8 is an end elevation of my drier as shown at Figure 1 of the drawings.
Figure 7:
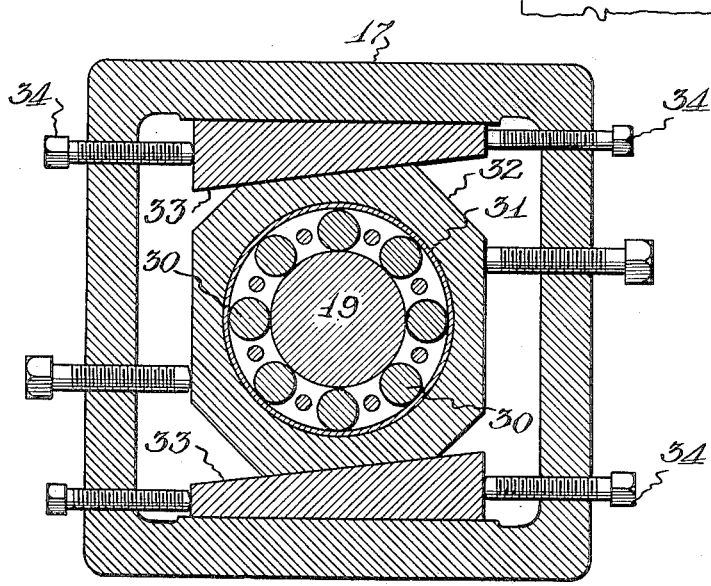
Figure 7 is a vertical section taken on line 7, 7 of Figure 2, and—

The radial agitators carried by the horizontally disposed agitator shaft 19 are constructed in sets as shown (Figs. 3—4—5 and 6) each set comprising a cast iron block or shoe 52 made in two halves, similar to one another in all respects (Figs. 3 and 4) which shoes 52 are adapted to fit snugly over a shaft square in cross section and to be locked together and to the shaft by means of bolts 53 passing through the apertures 54—54 in each half in turn. The upper face of the shoe 52 is provided with a recess 55 running the full length of the face, the side walls 56 of which are reinforced at 57, being higher at 58 to accommodate the additional strain at this point.

The agitator arms 59 are fabricated from flat bars of steel, a separate bar being carried in each recess 55 and the lock bolts 53 passing therethrough. These bars are then bent to meet each other at their outer ends 60, wherein is interposed the agitator paddle or blade 61; the ends of the arms are riveted together and through the plate, by rivets 62 as shown.

The outer edge 63 of the paddle 61 is molded to conform to the corrugations of the inner shell 10 for the purposes heretofore mentioned.

In operation, the material to be dried or dehydrated, in a plastic state, by reason of the moisture contained therein, is introduced through the hopper 43 into the inner heated cylinder or shell 10, the mass being constantly and slowly agitated and subjected to a high temperature for several hours, by which time it will have become dehydrated and may be removed through the discharge opening 45, in a manner obvious. The moisture-laden vapor is drawn out through a condenser or exhaust fan (not shown) and discharged from the apparatus, while the dehydrated particles will drop back into the apparatus and be subjected to a still further agitation and drying.

As will be readily appreciated, the principal wear upon the inner cylinder 10 is at the lower side, so that this side is the first to become impaired by reason thereof, and it has been customary in the use of the conventional form of these driers, when thus impaired, to reverse them so that what was the lower side then becomes the upper side. In this manner life of the apparatus was increased.

By my invention, I am enabled, practically, to still further and to more than double the life of my apparatus by turning the same only one fourth of a revolution; this by reason of the fact that so much of the bottom surface of the inner cylinder does not become impaired as heretofore because of the fact that it is kept clear of deposits of matter to a far greater extent, as heretofore explained, and for the further reason that there is an utter absence of rivets that become loosened and their efficiency impaired by reason of such excess deposits of material, all as clearly brought out in my former patent above referred to.

I am aware that prior to my invention jacketed driers with horizontally disposed agitator shafts carrying radial agitator arms were in common use.

I, therefore, do not claim such a combination broadly; but—

I claim:—

1. The combination of an agitator drier comprising an outer cylinder, an inner cylinder, means for spacing apart the respective cylinders and forming a jacket around the latter, opposed heads secured to the respective ends of the jacketed cylinder so formed, means for charging and discharging material to and from the interior of the inner cylinder, and means for removing vapors therefrom; of adjustable vacuum tight journals carried by said heads, an agitator mounted therein, and means for rotating said agitator with respect to the cylinder.

2. In combination with an agitator type, steam jacketed drier having opposed heads secured to the respective ends thereof, journals carried by said heads; of a carriage mounted within each of said journals, bearings mounted within said carriage, and means for adjusting said carriage both laterally and longitudinally.

3. In combination with an agitator drier consisting of an outer cylinder, an inner annularly corrugated cylinder, means for spacing apart the respective cylinders and forming a jacket around the latter, opposed heads secured to the respective ends of the jacketed cylinder so formed, and means for charging and discharging material to and from the interior of the inner cylinder, of journals secured to the heads above mentioned, bearings adjustably mounted within said journals, means for lubricating said bearings, and means for packing said bearings.

4. The combination with an agitator drier comprising a receptacle for the material to be dried and means for charging and discharging the same, of journals carried by said receptacle, a carriage mounted within each of said journals, bearings mounted in said carriage, means for adjusting said carriage both laterally and longitudinally, an agitator shaft journaled in said bearings, and agitator members carried by said shaft.

5. The combination of an agitator drier comprising a receptacle for the material to be dried and means for charging and discharging the same, of journals carried by said receptacle, a carriage mounted within each of said journals, roller bearings mounted in said carriage, means for adjusting said carriage comprising wedge blocks laterally adjustable against the walls of the journals, and an agitator shaft journaled in said bearings.

6. The combination with an agitator drier comprising a receptacle for the material to be dried and means for charging and discharging the same, of journals carried by said receptacle, a carriage mounted within each of said journals, roller bearings mounted in said carriage, means for lubricating said bearings, means for packing said carriage, and an agitator shaft journaled in said bearings.

7. The combination with an agitator drier comprising a receptacle for the material to be dried and means for charging and discharging the same, of journals carried by said receptacle, a carriage mounted within each of said journals, roller bearings mounted in said carriage, an agitator shaft journaled on said rollers, means for lubricating said bearings, means for packing said journal vacuum tight comprising a collar interposed between the carriage and the journal housing, and rings of packing carried by said collar against the journal housing, the agitator shaft and the carriage.

Signed at Chicago, Illinois, in the presence of the two subscribing witnesses, this twenty-third day of March, 1920.

GEORGE W. CHILDS, [L. S.]
*Administrator of the estate of Peter J. Hamler, deceased.*

Witnesses:
A. R. RIEGLER,
WM. HAROLD EICHELMAN.